United States Patent
Alelyunas et al.

[19]

[11] Patent Number: 6,094,422
[45] Date of Patent: Jul. 25, 2000

[54] ECHO CANCELLER TOUCH-UP PERIOD IN AN ECHO-CANCELLING MODEM

[75] Inventors: Carl H. Alelyunas; Andrew L. Norrell, both of Nevada City, Calif.

[73] Assignee: 3Com Corporation, Santa Clara, Calif.

[21] Appl. No.: 08/924,596

[22] Filed: Sep. 4, 1997

Related U.S. Application Data

[63] Continuation-in-part of application No. 08/713,134, Sep. 16, 1996, Pat. No. 5,892,757, which is a continuation of application No. 08/193,730, Feb. 9, 1994, Pat. No. 5,579,305.

[51] Int. Cl.$^7$ ............................................. H04B 3/23
[52] U.S. Cl. ........................ 370/286; 370/292; 375/222; 379/410
[58] Field of Search .................................. 370/282, 286, 370/292; 375/222, 231; 379/410

[56] References Cited

U.S. PATENT DOCUMENTS

| | | | |
|---|---|---|---|
| 4,792,940 | 12/1988 | Hiraguchi . | |
| 4,894,820 | 1/1990 | Miyamoto et al. . | |
| 5,005,168 | 4/1991 | Cummiskey et al. | 370/294 |
| 5,353,280 | 10/1994 | Ungerbock | 370/292 |
| 5,546,459 | 8/1996 | Sih et al. . | |
| 5,909,426 | 6/1999 | Liau et al. | 370/292 |

OTHER PUBLICATIONS

International Search Report for PCT Application Serial No. PCT/US98/18019, Dated Mar. 25, 1999.

*Primary Examiner*—Min Jung
*Attorney, Agent, or Firm*—McDonnell Boehnen Hulbert & Berghoff

[57] ABSTRACT

Abbreviated subsystem retraining in a local modem including an information processor having a plurality of subsystems configurable with the information processor for data communications over a first transmission medium, e.g., an analog local loop of a public telephone network. The local modem subsystems are configured with the information processor in accordance with at least one operating characteristic of the first transmission medium, such as the echo characteristics or the like. A remote modem for data communications over a second transmission medium, e.g., a digital telephone network (DTN) is coupled to the first transmission medium for providing an exchange of information between the local modem and the remote modem. The local modem is operable in a retraining mode, responsive to the at least one operating characteristic of the first transmission medium, e.g., echo divergence, observed by the information processor during the exchange of information between the local modem and said remote modem. The local modem then sends an informational signal to the remote modem for reconfiguring at least one of the plurality of subsystems such as the echo canceller with the information processor.

17 Claims, 2 Drawing Sheets

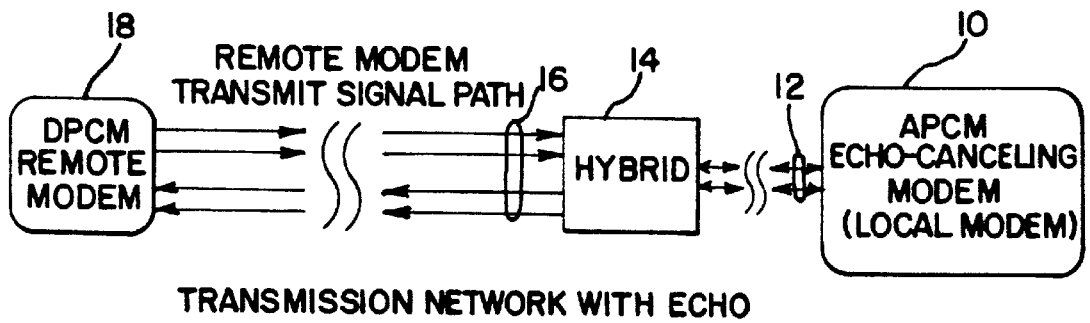
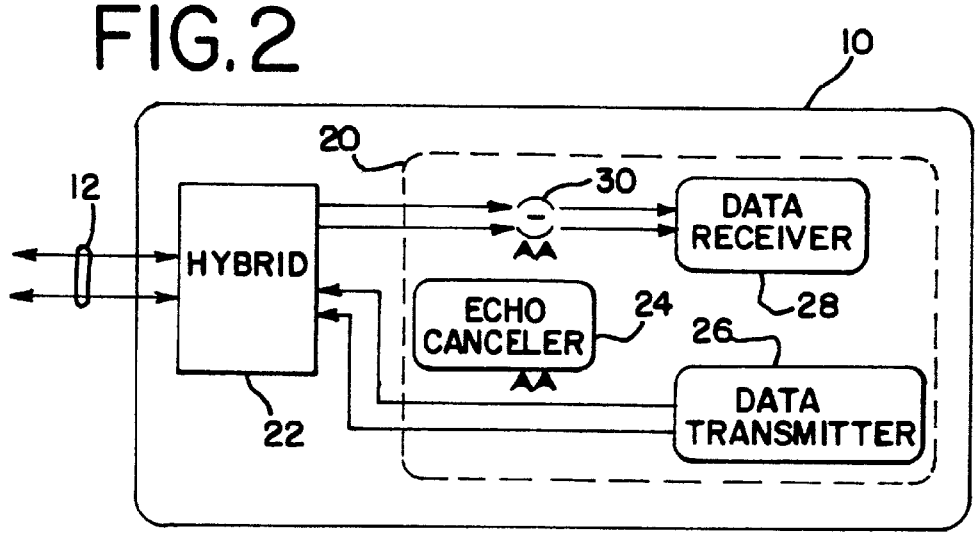
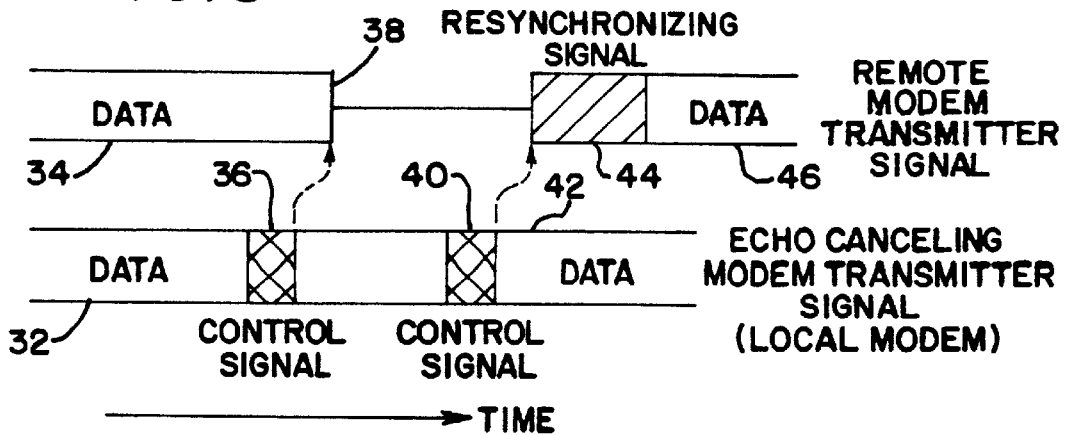

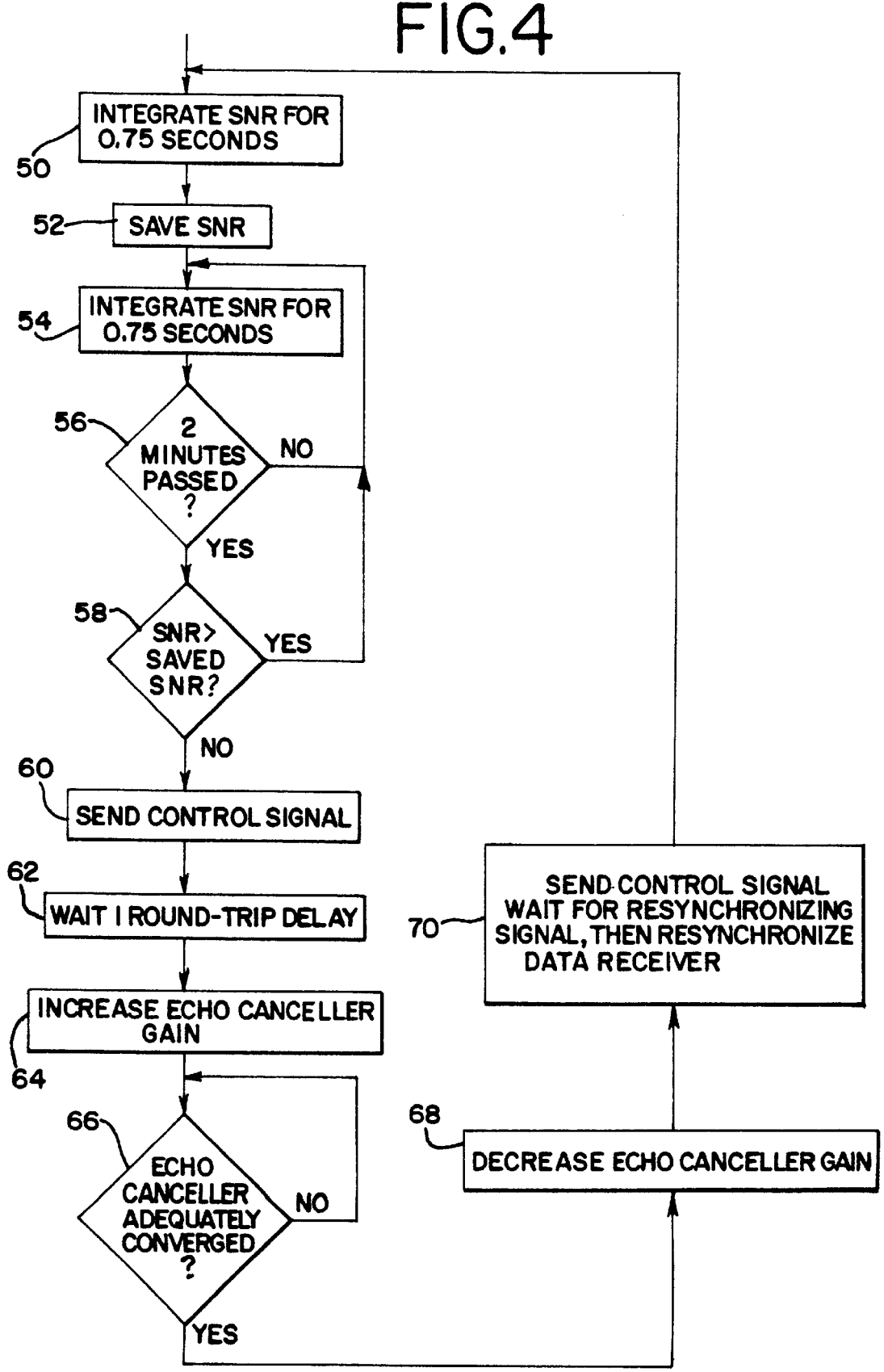

ECHO CANCELLER TOUCH-UP PERIOD IN AN ECHO-CANCELLING MODEM

CROSS-REFERENCES TO RELATED APPLICATIONS

The present application is a continuation-in-part of U.S. patent application, Ser. No. 08/713,134 filed Sep. 16, 1996, now U.S. Pat. No. 5,892,757 which is a continuation of U.S. patent application, Ser. No. 08/193,730 filed Feb. 9, 1994, issued as U.S. Pat. No. 5,579,305 to Norrell, et al. for "Asymmetric Duplex Modem Utilizing Narrow Bond Echo Cancellation on Nov. 26, 1996.

COPYRIGHT NOTICE

A portion of disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

The present invention relates to digital communication systems, and more particularly relates to on echo canceller touch-up period in an echo-cancelling modem.

B. Description of the Related Art

Although arbitrarily high transmission rates can be attained over special-purpose, wideband transmission circuits, such links are typically unavailable and transmission must accordingly be handled by conventional, voice-grade, dial-up telephone lines. Such standard phone lines, however, have severely limited bandwidth, are subject to line noise, and typically exhibit line irregularities and poor termination, making them echo-prone. These factors severely complicate the task of improving modem transmission speeds over dial-up lines. Better use of the roughly 3,400 KHZ bandwidth available on the dial-up network has been realized by using advanced modulation and equalization techniques. Modems capable of operating at high speeds, such as those conforming to the CCITT V.32 Bis standard, achieve this by using a modulation method called "quadrature amplitude modulation" (QAM), in which both the amplitude and phase of the signal are modulated.

Echo cancellation is an important technique which allows the forward and reverse channels to overlap. This scheme is found in the CCITT V.32 recommendation for a full-duplex 9600 bps per second modem in which the modem simultaneously receives information over the same frequency band on which it is transmitting. The same scheme is found in the CCITT V.32 Bis recommendation. For a modem to simultaneously receive information over the same frequency band on which it is transmitting, however, each modem must be able to substantially cancel out the "echoes" of its own transmitted signal. Echoes are reflections of the transmit signal typically caused by a discontinuity in the transmission path of the signal, such as an impedance mismatch.

High speed modems for terrestrial applications often use echo cancellation techniques to make full use of the available bandwidth simultaneously in both directions. Echo cancellers are designed to cancel the portion of the received signal associated with the local transmitter. V.32 and V.32 Bis use a method called "echo cancellation" to eliminate the reflected transmitted signal. This method involves subtracting a locally synthesized replica of the reflected transmitted signal from the composite received signal. High speed modems utilizing the CCITT V.32 Bis standard are known to those of ordinary skill in the art and are commonly available, and such modems are made by several companies.

Echo cancellers are typically predictor structures that predict the incoming echo samples of a modem transmitter based on knowledge of the transmitter's past output samples. A typical modem echo canceller structure simply subtracts a weighted sum of some number of past outputs from the current receive sample. If the weighting function is properly chosen, and certain linearity conditions hold, the receive signal is essentially free of echo from the local transmitter. The recently developed Pulse Code Modulation (PCM) modems also take advantage of echo cancelling to achieve higher data rates.

In fact, PCM modems require a much deeper echo canceller null than previous generation modems. As a result, PCM modems have greater echo canceller sensitivity to cold-start modem impedance shifts. Divergence of the echo canceller in an echo cancelling PCM modem significantly effects transmission error rates due to the inability of the modem to properly discern the pulse code modulated levels in the presence of an echo signal. Moreover, slow changes in transmission medium characteristics over time such as that caused by temperature changes and the like can have a profound impact on modem error and transmission rates. Therefore it would be desirable to allow the PCM modem to quickly tune its echo canceller without a full retrain procedure.

SUMMARY OF THE INVENTION

It is an object of the present invention to address the problems associated with echo cancelling to overcome the disadvantages of the prior art.

It is another object of the present invention to provide data communication systems and methods for facilitating abbreviated subsystem retraining.

It is a further object of the present invention to provide data communication systems and methods utilizing an abbreviated echo canceller retrain procedure.

It is yet another object of the present invention to provide modern apparatus for sending an informational signal for initiating an echo canceller touch-up period in an echo cancelling modem.

In a described embodiment, an echo cancelling modem apparatus, includes: an information processor having a data transmitter subsystem, a data receiver subsystem and an echo canceller subsystem coupled between said data transmitter and said data receiver subsystems, said echo canceller subsystem subtracting a weighted sum of the data sent by said data transmitter subsystem. A hybrid circuit for receiving and transmitting bidirectional data communications over a first transmission medium, and for coupling the first transmission medium to the data receiver subsystem of the information processor for receiving information over the first transmission medium, and coupling the data transmitter subsystem of the information processor for transmitting data to the first transmission medium via the hybrid. The information processor being operable in a retraining mode, responsive to at least one operating characteristic of the first transmission medium observed by the information processor during the exchange of information between the first transmission medium and the hybrid circuit couple to the data receiver and data transmitter subsystems, for sending an informational signal over the first transmission medium or reconfiguring the echo canceller subsystem of the information processor. A data communications method of facilitating abbreviated subsystem retraining between a local modem and a remote modem, integrates a first operating characteristic observed over a transmission medium coupled to the local modem, stores the first operating characteristics. While exchanging information between the local modem and the remote modem for a predetermined time period, integrating if a second operating characteristic observed over the transmission medium coupled to the local modem is performed. Thereafter, the first operating characteristic is compared to the second operating characteristic to identify deviation in at least one related operating characteristic of the transmission medium. It is then determined whether a subsystem corresponding to the related operating characteristic should require reconfiguration, and reconfiguring the subsystem identified in the determining step to adapt for the deviation identified in the comparing step is facilitated by the embodiment.

Briefly summarized, the present invention relates to methods and apparatus for facilitating an abbreviated subsystem retraining in which: a local modem includes an information processor having a plurality of subsystems configurable with the information processor for data communications over a first transmission medium. The local modem subsystems are configurable by the information processor in accordance with at least one operating characteristic of the first transmission medium. A remote modem may be provided for data communications over a second transmission medium coupled to the first transmission medium for exchange of information between the local modem and the remote modem. The local modem is operable in a retraining mode responsive to the at least one operating characteristic of the first transmission medium observed by the information processor during the exchange of information between the local modem. In the retraining mode, the local modem sends an informational signal to the remote modem for reconfiguring at least one of the plurality of subsystems with the information processor.

BRIEF DESCRIPTION OF THE DRAWINGS

The foregoing and other objects, features or advantages of the present invention may be more readily appreciated by reference to the disclosure when considered in conjunction with the accompanying drawings and the detailed description of the preferred embodiments described below, in which:

FIG. 1 is a black diagram of a data communications system for use in accordance with the present invention;

FIG. 2 is a block diagram of an echo cancelling modem, herein the local modem 10 of the system of FIG. 1;

FIG. 3 is a signalling diagram for a method facilitating abbreviated echo canceller retraining in accordance with the invention; and FIG. 4 is a program flow chart for an echo canceller touch-up period in an echo-cancelling modem.

DETAILED DESCRIPTION OF THE PREFERED EMBODIMENTS

With reference to FIGS. 1 and 2, an echo cancelling modem apparatus, local modem 10 herein an Analog Pulse Code Modulation (APCM) echo cancelling modem is shown in a data communications system facilitating abbreviated subsystem retraining, wherein local modem 10 includes an information processor 20 having a plurality of subsystem's, i.e., echo canceller 24, data transmitter 26, and data receiver 28 configurable with the information processor for data communications over a first transmission medium 12, herein an analog local loop. The local modem subsystems 24,26 and 28 are configured with the information processor in accordance with at least one operating characteristic, e.g., the echo signals of the first transmission medium 12 of remote modem 18, herein a Digital Pulse code Modulation (DPCM) modem, for data communications over a second transmission medium, e.g., digital telephone network (DTN), coupled via hybrid 14 to the first transmission medium for providing an exchange of information between local modem 10 and the remote modem 18. The local modem 18 is operable in a retraining mode, responsive to the at least one operating characteristic such as the signal to noise ratio (SNR) of the first transmission medium 12 observed by the information processor 20 during the exchange of information between the local modem 10 and the remote modem 18, for sending an informational signal to the remote modem 18 for reconfiguring at least one of the plurality of subsystems with the information processor 20, e.g., the echo canceller 24.

The echo cancelling modem apparatus of local modem 10 provides the data transmitter subsystem 26, a data receiver subsystem 28 and an echo canceller subsystem 24 coupled between said data transmitter and said data receiver 28 subsystems. The echo canceller subsystem 24 subtracts a weighted sum of the data sent by said data transmitter subsystem 26. A hybrid circuit 22 is provided in the local modem 10 for receiving and transmitting bidirectional data communications over a first transmission medium 12 and for coupling said first transmission medium to the data receiver subsystem 28 of the information processor 20 for receiving information over the first transmission medium 12, and for coupling the data transmitter subsystem 26 of the information processor 20 for transmitting data to said first transmission medium via said hybrid 22. The information processor 20, typically a microprocessor or digital signal processor (DSP) is operable in the retraining mode, responsive to at least one operating characteristic of the first transmission medium 12 observed by the information processor 20 during the exchange of information between the first transmission medium 12 and the hybrid circuit 22 coupled to said data receiver 28 and data transmitter 26 subsystems.

Echo cancellers can be trained efficiently during the initial phase of a modem connection, often called the "handshake" or "training" period, as described in U.S. Pat. No. No. 5,579,305 Norrell, et al. for "Asymmetric Duplex Modem Utilizing Narrow Band Echo Cancellation" on Nov. 26, 1996 which is incorporated herein by reference. The training procedures for the common echo cancelling modem standards involve a half-duplex transmission period for both modems where the other end is silent. This allows for rapid convergence of the echo canceller solutions since the only signal present is echo from the local transmitter. Many modems also train their echo cancellers after handshaking is completed, but at a much reduced rate, often referred to as the "track mode". This is because the modems transmit in full-duplex mode after training, and the receive signals at both ends are a combination of echo signals plus far end transmitter signals. The far end transmitter signals are the desired receive signals for the modem, but are typically much stronger than the residual echo signals that the echo canceller uses to track, and thus are unwanted signals from the point of view of the echo canceller. Therefore, it is difficult for a modem's echo canceller to adapt to a changing echo path after the modems have entered full duplex mode unless the change is extremely gradual.

The echo canceller's solution is a function of numerous circuit elements, including the analog components of the modem and the transmission cable. The solution is valid so long as the characteristics of the various circuit elements remain fixed at the values they had when the echo canceller was trained. One factor that can change the characteristics of various circuit elements is temperature. If a modem is at room temperature when first turned on and trained, it may get considerably warmer during the first few minutes of operation. Such variance may arise from inexpensive transformers used in personal computer modems which may have characteristics which vary over time. This can cause a significant change in the echo path, typically beyond the ability of the echo canceller to adapt in tracking mode.

The embodiment of FIGS. 1 and 2 improve the performance of the high speed echo cancelling modem 10 operating over terrestrial circuits. The aforementioned thermal changes normally cause the modems to shift down to lower data rates than the initial connect data rates. This problem can be solved in many existing modem standards (V.34, V.32bis) by forcing a full retrain. However, this causes the modems to effectively start the connection from the beginning, except for call set up and answer procedures. All adaptive systems in the modem 10, including echo cancellers, are trained from scratch. This retrain process can take 10–20 seconds to complete. Thus a full retrain impacts significantly upon overall data communication rates. However, an abbreviated subsystem reconfiguration can accomplish the desired result in less than 1 seconds in most cases, with performance benefits equivalent to the 10–20 second procedure.

A description of the special procedure follows. A quick echo canceller retrain procedure is proposed in which an abbreviated echo canceller retrain procedure is incorporated in using the rate renegotiation mechanism. The (APCM) echo cancelling modem initiates a rate renegotiation procedure and requests quick echo canceller retrain by setting a quick echo cancelling (EC) train bit in MP. The remote modem 18, herein a Digital Pulse code Modulated (DPCM) modem then begins normal rate negotiation. However, when it detects the quick EC train bit, the remote modem 18 responds with an E sequence to send data and than repeat the PCM code that corresponds to silence until it begins receiving MP sequences without the quick EC train bit set. The APCM modem trains it echo canceller and then sends MP sequences without the quick EC train bit set. The modems then resume the normal rate renegotiation procedure.

The above modem subsystem retaining facilitates:
i) an echo-cancelling modem which exchanges signals with a remote modem over a transmission medium which will generate echo.
ii) an echo cancelling modem that can detect the divergence of its echo canceller, either directly or through an indirect process, e.g., the average SNR.
iii) an echo cancelling modem sending an informational signal to cause the remote modem to cease transmission of signals for a period of time.
iv) an echo cancelling modem sending the informational signal for the purpose of correcting the divergence of its echo canceller.
v) a modem in which the informational signal can cause other behaviors in the remote modem which include the period of cessation of remote modem signal transmissions for the purpose of correcting the divergence of its echo canceller.
vi) a modem in which the informational signal can cause a complete retrain of both modem's receivers for the purpose of correcting the divergence of the echo cancelling modem's echo canceller.

Turning now to FIG. 3, a signaling diagram showing the timing of data exchange between the local modem 10 (bottom) on the remote modem 18 (top). Initially data 32 and 34 is exchanged between local modem 10 and remote modem 18, whereupon a control signal 36 is sent from the local echo-cancelling modem 10 to the remote modem 18 which tells the remote modem 18 to enter a special echo canceller training sequence. This special sequence includes a half-duplex transmission period during which the initiating modem is the only source of signal on the line. The remote modem 18 ends its data transmission at 38. The initiating modem can use this half-duplex period to train its echo canceller. Because this is done in half-duplex mode, and because the echo has not changed significantly, the training period can be very short, perhaps 250 ms., compared to many minutes if the modem relied on track mode. After the initiating modem is content with its echo canceller training, it signals the remote modem to resume normal operation with another control signal 40. The remote modem then sends a short synchronization sequence and resumes data transmission. Thereafter, local modem data 42 and remote modem data 46 resumes the exchange of information between the local modem 10 and the remote modem 18.

The major problem addressed by this method is thermal instability of hybrid components. A very small change in absolute echo level may result in a very large change in the level of uncancelled echo within the echo-cancelling modem. Uncancelled echo appears to the echo-cancelling modem as noise, degrading the echo-cancelling modems's SNR (signal to noise ratio). When the remote modem is transmitting, the tracking of the echo-cancelling modem echo canceller must be at a very slow rate. When the echo-cancelling modem detects that uncancelled echo is increasing, or that its receiver's SNR is degrading at a rate consistent with decreasing ability to cancel echo, it can initiate this special procedure during which its echo canceller can be re-optimized.

FIG. 4 is a program flow chart for an echo canceller touch-up, in a echo cancelling modem such as the local modem 10. The communications method facilitating an abbreviated echo canceller retraining between the local modem 10 and the remote modem 18 initially integrates the signal to noise ratio (SNR) for 0.75 seconds at step 50. This first integrated signal noise ratio is then stored as a first operating characteristic at step 52 which causes the information processor 20 of the local modem 10 to save the integrated signal to noise ratio. A program flow proceeds at step 54 wherein the signal to noise ratio is again integrated for 0.75 seconds. After 2 minutes as passed, as determined at step 56, a determination is made at step 58 as to whether the second signal noise ratio determined at step 54 is greater than the saved signal to noise ratio from step 50. If the first signal to noise ratio is greater is than the second signal noise ratio, then there has not been a degradation in the operating characteristics of the transmission medium 12 for the local modem 10, and thus program flow will proceed in a loop back to step 52.

On the other hand, if step 58 determines that the operating characteristics of the transmission medium 12 is degraded as indicated by a reduced signal to noise ratio at step 58, then program flow proceeds to step 60. At step 60, the control signal 36 (see FIG. 3) initiates the echo canceller touch-up period for the local modem 10. At step 62, the local modem 10 waits a single round-trip delay and increases the echo canceller gain at step 64. Decision block 66 determines whether the echo canceller is adequately converged, or whether the echo characteristics of the transmission medium 12 are diverging. If the echo canceller is adequately converged as indicated at step 66, then a decrease in the echo canceller gain is provided at step 68. Thereafter, step 70 sends a control signal for waiting for reschincronization allowing are synchronization of the data receiver 28 of the local modem 10. Program flow then loops back to step 50 where the integrated signal to noise ratio is again observed.

PCM modems are considerably more sensitive to uncancelled echo than V.34, as V.34 requires SNR in the range of 40 dB while PCM modems require as much as 70 dB (1000 times greater). This method is thus desirable in high speed PCM modems instead of the echo-cancelling modem calling for a complete retrain when its echo canceller has diverged. A full retrain can take 10 seconds or more. This novel method is considerably faster because it only attempts to update the echo canceller, the rest of the modem's subsytems are preserved. However, in the foregoing method of calling for a retrain on echo canceller divergence it should be appreciated that the various other modem subsystems may also be retained during an abbreviated touch-up. It may be advantageous to include this touch-up period within one or more previously defined functions, like rate renegotiation. Moreover, as described, the retrain may be performed upon a null rate renegotiation. Alternatively, since the retraining session is short in duration, it may be performed randomly or periodically based upon a time delay in the data communications.

The preferred embodiments of the data communications systems, methods and apparatus having been shown and decided herein it should be appreciated by those skilled in the art that modifications may be made or may be suggested without departing from the true scope and spirit of the invention. Thus, it is intended that the invention be defined by the appended claims.

What is claimed is:

1. A data communications system facilitating abbreviated subsystem retraining, comprising:

a local modem including an information processor having a plurality of subsystems configurable with the information processor for data communications over a first transmission medium, said local modem subsystems including an echo canceller subsystem being configured with the information processor in accordance with at least an echo channel characteristic;

a remote modem for data communications over a second transmission medium coupled to the first transmission medium for providing an exchange of information between said local modem and said remote modem; and said local modem being operable in a retraining mode, responsive to the echo channel characteristic observed by the information processor during the exchange of information between said local modem and said remote modem, for sending an informational signal to said remote modem and for adjusting said echo canceller subsystem.

2. A system as recited in claim 1 wherein said echo channel characteristic comprises an echo level, wherein the echo corresponds to the information exchanged between said local modem and said remote modem.

3. A system as recited in claim 2 wherein the plurality of subsystems of the information processor of said local modem further comprises a data transmitter subsystem and a data receiver subsystem, wherein said echo canceller subsystem is coupled between said data transmitter and said data receiver subsystems, said echo canceller subsystem subtracting a weighted sum of the data sent by said data transmitter subsystem from the data received at said data receiver subsystem to cancel the echo.

4. A system as recited in claim 3 wherein the weighted sum used by said echo canceller subsystem is determined by the information processor adjusting the echo canceller subsystem in said local modem.

5. A system as recited in claim 4 wherein said echo level comprises an increased residual echo signal level detected at the local modem indicative of divergence of said echo canceller subsystem.

6. A system as recited in claim 4 wherein said echo channel characteristic observed by the information processor during the exchange of information between said local modem and said remote modem comprises a reduced signal to noise ratio (SNR) detected at the local modem indicative of divergence of said echo canceller subsystem.

7. A system as recited in claim 6 wherein said echo channel characteristic observed by the information processor during the exchange of information between said local modem and said remote modem comprises a running average of the signal to noise ratio (SNR) which is detected at the local modem indicative of divergence of said echo canceller subsystem.

8. A system as recited in claim 4 wherein said remote modem transmits silence for a period of time in response to the sending of the informational signal to said remote modem by the local modem.

9. A system as recited in claim 4 wherein said local modem and said remote modem renegotiate the data communications rate of the exchange of information between said local modem and said remote modem in response to the sending of the informational signal to said remote modem by the local modem.

10. A system as recited in claim 9 wherein said local modem and said remote modem perform a null rate renegotiation of the exchange of information between said local modem and said remote modem in response to the sending of the informational signal.

11. An echo cancelling modem apparatus, comprising:

an information processor comprising a data transmitter subsystem, a data receiver subsystem and an echo canceller subsystem coupled between said data transmitter and said data receiver subsystems, said echo canceller subsystem subtracting a weighted sum of the data sent by said data transmitter subsystem;

a hybrid circuit for receiving and transmitting bidirectional data communications over a first transmission medium, and for coupling said first transmission medium to said data receiver subsystem of said information processor for receiving information over said first transmission medium, and coupling said data transmitter subsystem of said information processor for transmitting data to said first transmission medium via said hybrid; and said information processor being operable in a retraining mode, responsive to at least one measure of echo canceller performance observed by said information processor during the exchange of information between said first transmission medium and said hybrid circuit coupled to said data receiver and data transmitter subsystems, for sending an informational signal over said first transmission medium and for adjusting the echo canceller subsystem of the information processor.

12. An apparatus as recited in claim 11 wherein said at least one measure of echo canceller performance comprises an increased echo level.

13. An apparatus as recited in claim 11 wherein said at least one measure of echo canceller performance comprises an increased residual echo level.

14. A data communications method of facilitating abbreviated subsystem retraining between a local modem and a remote modem, comprising the steps of:
- integrating a first operating characteristic indicative of echo canceller performance within the local modem;
- storing said first operating characteristics;
- exchanging information between the local modem and the remote modem for a predetermined time period;
- integrating a second operating characteristic indicative of echo canceller performance within the local modem;
- comparing said first operating characteristic and said second operating characteristic to identify deviation in at least one related operating characteristic of the transmission medium;
- determining whether an echo canceller subsystem should require adjustment; and
- adjusting the echo canceller subsystem identified in said determining step to adapt for the deviation identified in said comparing step.

15. A method exercising claim 14 wherein said integrating steps integrate a first signal to noise ratio (SNR) value and a second signal to noise ratio (SNR) value.

16. A method exercising claim 15 wherein the deviation in said related operating characteristic comprises an echo canceller divergence related to a decreased signal to noise ratio at the local modem.

17. A data communications system for facilitating abbreviated subsystem retraining between a local modem and a remote modem, comprising;
- means for integrating a first operating characteristic indicative of echo canceller performance of the local modem;
- means for storing said first operating characteristics;
- means for exchanging information between the local modem and the remote modem for a predetermined time period;
- means for integrating a second operating characteristic indicative of echo canceller performance of the local modem;
- means for comparing said first operating characteristic and said second operating characteristic to identify deviation in at least one related operating characteristic;
- means for determining whether an echo canceller subsystem corresponding to the related operating characteristic should require reconfiguration; and
- means for adjusting the echo canceller subsystem identified by said determining means to adapt for the deviation identified by said comparing means.

* * * * *